ELECTRICAL SHOCK WAVE MICROWAVE OSCILLATOR AND CONTROL THEREOF

Filed Dec. 17, 1965

INVENTOR
SOL TRIEBWASSER

BY
Bernard N. Wiener
ATTORNEY 3,418,600

ELECTRICAL SHOCK WAVE MICROWAVE OSCILLATOR AND CONTROL THEREOF

Sol Triebwasser, Peekskill, N.Y., assignor to International Business Machines Corporation, Armonk, N.Y., a corporation of New York Filed Dec. 17, 1965, Ser. No. 514,517
12 Claims. (Cl. 331—97)

ABSTRACT OF THE DISCLOSURE

This invention provides a microwave oscillator having an electrical shock wave device coupled to a microwave resonant cavity. The oscillator is operated in a pulse-driven mode for which there is phase coherence of the current waves produced by the electrical shock wave device. There is coordination of the periods of both the input triggering pulse train and the output current waves so that the microwave oscillations in the cavity are energized at constant phase. This is accomplished by establishing the repetition rate $f_p$ of the input pulse train and the frequency of the microwave oscillation $f_m$ so that the ratio of the period $T_p$ of the input pulse train to the period of the output microwave oscillation $T_m$ is an integer. In the practice of this invention the electrical shock wave device is coupled to a high Q microwave resonant cavity to provide coherent continuous wave microwave oscillation output. Phase control of the continuous wave oscillation is provided in features of this invention by especially controlling the phase of the triggering pulse train, the triggering pulse amplitude, and the level of a bias voltage.

This invention relates to electrical shock wave microwave oscillators and control thereof, and it relates more particularly to phase control of the output oscillations therefrom.

An electrical shock wave microwave oscillator utilizes an electrical shock wave device coupled to a microwave cavity. The electrical shock wave device is a monocrystalline compound semiconductor, e.g., n-type GaAs or InP. If an electric field having a magnitude above a particular threshold is applied across the crystalline region of an electrical shock wave device, a current fluctuation is produced in a load circuit coupled thereto. The current fluctuation has been determined theoretically to originate from hot electrons which group in the semiconductor crystal under influence of the electric field and give rise transiently to an electrical shock wave that propagates between the terminals of the crystalline region. The original electrical shock wave microwave oscillator is presented in copending U.S. patent application S.N. 374,758, filed June 12, 1964, by J. B. Gunn, and assigned to the assignee hereof, now U.S. Patent No. 3,365,583 issued Jan. 23, 1968. It is a continuation-in-part of U.S. patent application S.N. 286,700, filed June 10, 1963, and now abandoned. A background article concerning the electrical shock wave device is presented in the IBM Journal of Research and Development for April 1964 at pages 141–159.

An energized electrical shock wave device provides output current pulses whose initiation and character are accurately related to the nature and duration of the input voltage pulse, i.e., the sequence of electrical shock waves generated in the semiconductor region is accurately dependent on the starting time and shape of the triggering or driving pulse. Thus, for an input pulse which is repeated identically in a train of voltage pulses, the output current wave from the electrical shock wave microwave oscillator is repeated identically in both shape and phase relative to each identical member of the input train of voltage pulses. However, the repetitive nature of the sequential current waves does not ensure their phase coherence relative to each other.

In the operation of the prior art electrical shock wave device, as described in the noted copending patent application and articles, the output current oscillation is a series of individual oscillatory pulses. The phase of the microwave oscillations in a microwave cavity to which the electrical shock wave device is coupled is accurately dependent on the time and shape of the triggering or driving pulse. If the triggering pulse is so long in duration as effectively to be direct voltage, the microwave oscillation is continuous wave.

Heretofore, higher output power and efficiency have been obtained from electrical shock wave microwave oscillators operated under pulse-driven mode than from oscillators driven continuously by application thereto of a direct voltage level for the entire time interval of oscillatory output. Further, it is important for some applications for a continuous wave microwave oscillator that there be available readily implemented and easily controlled techniques for altering the phase of the output oscillation.

It is an object of this invention to provide an electrical shock wave microwave oscillator operated in a pulse-driven mode and pulse control of the output oscillations therefrom.

It is another object of this invention to ensure phase coherence of the output oscillations from an electrical shock wave microwave oscillator operated in a pulse-driven mode.

It is still another object of this invention to provide an electrical shock wave oscillator for which there is a predetermined relationship between the frequency of the microwave oscillation and the pulse repetition rate of the driving pulses.

It is a further object of this invention to provide a coherent continuous wave electrical shock wave microwave oscillator for which the ratio of the frequency of the output microwave oscillation to the input triggering pulse repetition rate is an integer.

Broadly, this invention provides an electrical shock wave microwave oscillator coupled to a microwave cavity operated in a pulse-driven mode for which there is phase coherence of the current waves produced by an electrical shock wave device therein. There is coordination of the periods of both the input triggering pulse train and the output current waves so that the microwave oscillations in the cavity are energized at constant phase. This is accomplished by establishing the repetition rate $f_p$ of the input pulse train and the frequency of the microwave oscillation $f_m$ so that the ratio of the period $T_p$ of the input pulse train to the period of the output microwave oscillation $T_m$ is an integer. In the practice of this invention the electrical shock wave device is coupled to a high Q microwave resonant cavity to provide coherent continuous wave microwave oscillation output. Phase control of the continuous wave oscillation is provided in features of this invention by especially controlling the phase of the triggering pulse train, the triggering pulse amplitude, and the level of a bias voltage.

The foregoing and other objects, features and advantages of the invention will be apparent from the following more particular description of a preferred embodiment of the invention as illustrated in the accompanying drawings.

Figure 1:
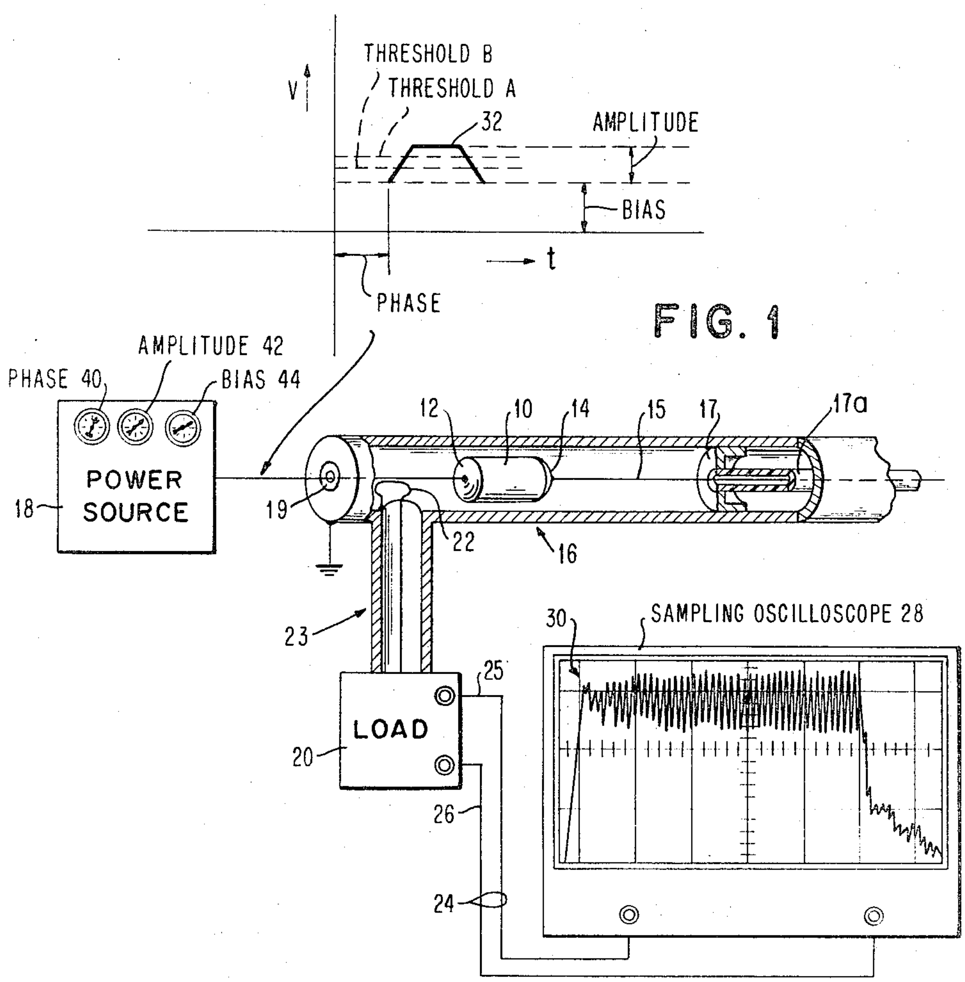
FIGURE 1 is a schematic diagram of an electrical shock wave microwave oscillator according to this invention, illustrating the electrical shock wave device used therefor connected to a resonant microwave cavity and the nature of an input voltage pulse and the related output current for a low Q cavity.

In FIG. 1, which is a schematic diagram of an electrical shock wave microwave oscillator for the practice of this invention, a semiconductor crystal 10, e.g., n-type GaAs, is connected by contacts 12 and 14, affixed thereto in electrical conduction relationship, via conductor 15 with resonant microwave coaxial cavity 16. Tuning of cavity 16 is obtained by adjustment of the position of movable shunt 17 which is slidable in insulation relationship on conductor 15 by insulation rod 17*a*. Power source 18 is connected to the electrical shock wave oscillator by conductor 15 which enters cavity 16 via insulator bushing 19. The output of the microwave oscillator drives a load 20 via magnetic loop 22 and output coaxial line 23 disposed near the left end of microwave cavity 16. For convenience of exposition, the power source 18 is considered to be a constant voltage source and the load 20 is considered to be purely resistive. A measure of the current in load 20 is obtained via coaxial line 24, which is illustrated as wire conductors 25 and 26, connected to sampling oscilloscope 28. Sampling oscilloscope 28 presents a picture 30 which exemplifies the nature of the current wave output from electrical shock wave device 10.

The physics of operation of the electrical shock wave device 10 requires that an input triggering pulse 32 reach a particular voltage threshold level A before the electrical shock wave is launched in semiconductor crystal 10. After the shock wave is launched in the semiconductor crystal, another shock wave is not initiated therein until it has traversed the entire length. Further, a new shock wave is propagated in the electrical shock wave device 10 only so long as the input triggering pulse voltage level is maintained above a second voltage threshold level B which is lower than threshold level A.

In operation the frequency $f_m$ of the microwave oscillation generated by the electrical shock wave microwave oscillator of FIG. 1 is determined by the geometry and nature of the semiconductor crystal 10 and the tuning of microwave cavity 16. The initiation of the current wave 30 is uniquely determined by the character of the leading edge of the input triggering voltage pulse 32, and the duration of pulse determines how long the microwave oscillation is driven by electrical shock wave propagation in the semiconductor crystal 10. Phase coherence of sequential current waves 30 is ensured by the practice of this invention.

Figure 2:
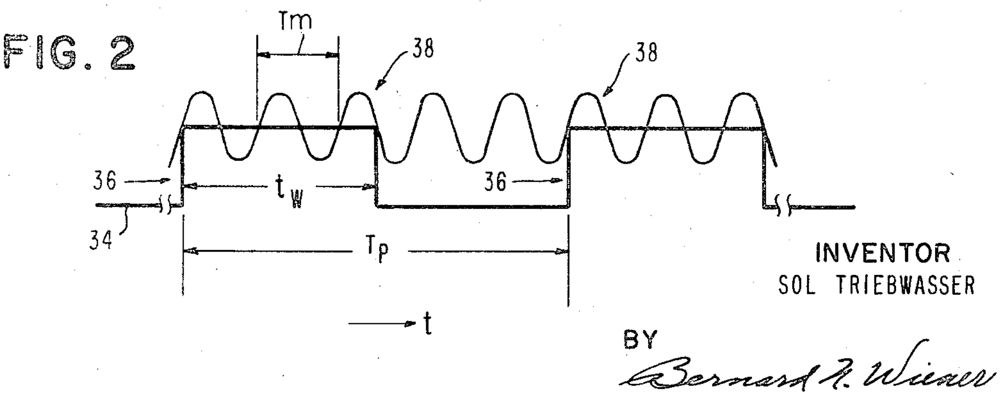
FIGURE 2 illustrates the nature of the time relationship between the input voltage triggering pulse train and the output current oscillation from an electrical shock wave microwave oscillator for the practice of this invention.

In FIG. 2 the period of an input triggering pulse train 34 is identified by the time interval $T_p$ between sequential pulses 36, and the operative time width of each pulse is indicated as $t_w$. The period of the output microwave oscillation 38 provided by the electrical shock wave device 10 is indicated as $T_m$ and the frequency is indicated by $f_m$. Physically, a voltage pulse 36 causes the electrical device 10 to produce a current wave 30 and it causes microwave cavity to produce oscillation 38. For convenience of exposition, the output microwave oscillation 38 is shown superimposed on the input voltage pulse train 34. This is an idealized diagram; an input triggering pulse 36 will not be a rectangular pulse because time is required for both the rise and fall of the leading and lagging edges, respectively. The phase of the oscillation 38 during a triggering pulse is uniquely related to the shape of the related input triggering pulse 36. In the practice of this invention, the period of the input triggering pulse train 34 and the period $T_m$ of the output oscillation 38 are related according to the relationship $$T_p/T_m=n$$

where $n$ is an integer. Under this operational condition, the portions of oscillation 38 driven by the respective voltage pulses 36 are identically phased in microwave cavity 16, i.e., there is phase coherence.

When the Q of the microwave cavity 16 is sufficiently high, i.e.

$$(T_p-t_w)f_m=<<Q$$

coherent continuous wave microwave oscillation output is provided by the practice of this invention. The Q of the microwave oscillator is a physical parameter which determines the power degradation per cycle of oscillation therein. Thus, oscillation 38 is sustained in microwave cavity 16 during the time interval between sequential triggering pulses 36 because the power degradation is minimized. In an operational circumstance the ratio $T_p/T_m$ is established by maximizing the amplitude of the output oscillation 38. Amplitude stability depends on the over-all Q of the system of FIG. 1, and the amplitude is maximum whenever $T_p/T_m=n$ is accurately an integer.

It has been recognized heretofore that the start of an output oscillation 30 (FIG. 1) is strongly dependent on the start of an input triggering pulse 32. In the practice of a feature of this invention, the phase of a continuous wave oscillation output 38 is shifted by altering the starting position of the input triggering pulse train 36 through adjustment of phase control 40 of power source 18.

It has been recognized heretofore that the initiation time of an output oscillation 30 (FIG. 1) is changed by a change in the amplitude of an input pulse 32. In the practice of a feature of this invention, the phase of a continuous wave oscillation output is altered by altering the amplitude of the pulses 36 of pulse train 34 through adjustment of amplitude control 42 of power source 18.

It has been recognized heretofore that the initiation time of an output oscillation 32 (FIG. 1) is altered by the application of a bias voltage for a given input voltage pulse, i.e., the onset of current instability in an electrical shock wave device 10 leading to oscillations is triggered when the electric field therein reaches a threshold value, e.g., threshold A of FIG. 1. In the practice of another feature of this invention, the phase of a continuous wave oscillation 38 is altered through adjustment of bias voltage control 44 of power source 18.

Since $$T_p/T_m=n$$

it follows that $f_m/f_p=n$.

Accordingly, the practice of this invention permits accurate calibration of the pulse repetition rate of the input wave train 34 when the frequency of microwave ocsillation 38 is accurately known.

While the invention has been particularly shown and described with reference to a preferred embodiment thereof, it will be understood by those skilled in the art that various changes in form and details may be made therein without departing from the spirit and scope of the invention.

What is claimed is:

1. A microwave oscillator comprising, in combination:
a resonant microwave cavity;
an electrical shock wave device coupled to said cavity; and
a power source means of a train of voltage pulses applying said pulses to said device, triggering respective current waves from said device, energizing via said current waves respective microwave oscillations in said cavity, and ensuring phase coherence of said oscillations relative to each other.

2. An oscillator according to claim 1 wherein said source means of voltage pulses applies said pulses to said device with a particular repetition rate.

3. An oscillator according to claim 1 wherein said source means of voltage pulses applies said pulses to said device with varying phase which varies the phase of said microwave oscillations.

4. A microwave oscillator comprising, in combination:
a resonant microwave cavity;
an electrical shock wave device coupled to said cavity; and
a power source means of a train of voltage pulses applying said pulses to said device at a particular pulse repetition rate, triggering a sequence of respective current waves from said device, and energizing via said current waves respective microwave oscillations in said cavity with a particular frequency which has a predetermined relationship to said pulse repetition rate, said energizing of said cavity by said current waves ensuring a constant phase of said oscillations.

5. An oscillator according to claim 4 wherein said source means applies said voltage pulses to said device so that the ratio of said pulse repetition rate to said frequency of said oscillations is an integer.

6. An oscillator according to claim 4 wherein said source means applies said voltage pulses to said device with altering phase in said cavity which alters the phase of said microwave oscillations in said cavity.

7. A microwave oscillator comprising, in combination:
a high Q resonant microwave cavity;
an electrical shock wave device coupled to said cavity;
a power source means of a train of voltage pulses applying said pulses at a particular repetition rate to said device, triggering a sequence of respective current waves from said device, and energizing via said current waves respective microwave oscillations in said cavity having a particular frequency, ensuring phase coherence of said oscillations relative to each other, and establishing a related coherent continuous wave microwave oscillation in said cavity at another particular frequency,
the ratio of said pulse repetition rate of said train of pulses to said particular frequency of said microwave oscillations being an integer, and the product of said particular frequency and the time difference between the period of said train of pulses and the time width of each said pulse being small compared to said Q of said cavity.

8. An oscillator according to claim 7 wherein said source means applies said pulses to said device with altering phase which alters the phase of said microwave oscillations.

9. An oscillator according to claim 7 wherein said source means of voltage pulses applies said pulses to said device with altering pulse amplitude which alters the phase of said coherent continuous microwave oscillation.

10. An oscillator according to claim 7 wherein said source means applies said pulses to said cavity with an altering bias voltage which alters the phase of said continuous wave microwave oscillation.

11. An oscillator comprising, in combination:
a resonant electromagnetic-wave cavity;
an electrical shock wave device coupled to said cavity; and
a power source means of a train of electrical energy pulses applying said pulses to said device, triggering respective electrical energy waves from said device, energizing via said electrical energy waves respective electromagnetic-wave oscillations in said cavity, and ensuring phase coherence of said oscillations relative to each other.

12. An oscillator comprising, in combination:
a resonant electromagnetic-wave cavity;
an electrical shock wave device coupled to said cavity; and
means triggering a train of electrical energy waves from said device, energizing respective electromagnetic-wave oscillations in said cavity, and ensuring phase coherence of said oscillations relative to each other.

References Cited

"Current Instabilities in Gallium Arsenide," Proc. of the IEEE, vol. 53, No. 11, November, 1965, pp. 1804–1805.

Gunn: Instabilities of Current in III–V Semiconductors, IBM Journal, April 1964, pp. 141–159 (p. 153 relied on).

Kuru: Frequency Modulation of the Gunn Oscillator, Proc. of the IEEE, October 1965, pp. 1642–1643.

Quist et al.: S-Band GaAs Gunn Effffect Oscillators, Proceedings of the IEEE, March 1965, pp. 303, 304.

JOHN KOMINSKI, *Primary Examiner.*

JAMES B. MULLINS, *Assistant Examiner.*

U.S. Cl. X.R.

331—101, 107